DRILLING BIT

Original Filed Aug. 20, 1964 4 Sheets-Sheet 1

*INVENTOR.*
HOMER I. HENDERSON

DRILLING BIT

Original Filed Aug. 20, 1964 4 Sheets-Sheet 2

*INVENTOR.*
HOMER I. HENDERSON
*BY*

ATTORNEYS

DRILLING BIT

Original Filed Aug. 20, 1964 4 Sheets-Sheet 3

*INVENTOR.*
HOMER I. HENDERSON
*BY*

ATTORNEYS

DRILLING BIT

Original Filed Aug. 20, 1964 4 Sheets-Sheet 4

INVENTOR.
HOMER I. HENDERSON
BY

ATTORNEYS

United States Patent Office

Re. 26,669
Reissued Sept. 30, 1969

26,669
DRILLING BIT

Homer I. Henderson, 2220 Live Oak St.,
San Angelo, Tex. 76901

Original No. 3,308,896, dated Mar. 14, 1967, Ser. No. 391,834, Aug. 20, 1964. Application for reissue May 9, 1968, Ser. No. 741,833
Int. Cl. E21b *9/36, 41/00*
U.S. Cl. 175—330 12 Claims

Matter enclosed in heavy brackets [ ] appears in the original patent but forms no part of this reissue specification; matter printed in italics indicates the additions made by reissue.

*ABSTRACT OF THE DISCLOSURE*

*A drilling bit for use in dual tube drill pipe earth boring. The drilling fluid descends in the annulus between the dual tubes, thence passes through the bit and ascends within the inner tube, carrying the cuttings, and cores, if any, to the earth's surface. The shank of the bit is substantially full hole to restrict the drilling fluid from ascending in the hole annulus. The bit's shank may be fluted to permit fluid passage when the bit is off bottom. Such flutes, if any, may carry cutting blades at their tops to facilitate drilling upwardly when a bore hole caves. The bit has bottom cutting blades of a width that will permit intrusion into soft formations to effect cutting action as a drag bit. These same blades are impregnated with hard particles, such as diamonds, which particles protrude and penetrate hard rock formations, that are too hard for the complete blade to penetrate, thus assuring that the bit will cut both soft and hard formations. The base of the bit has tapered sections that progressively place more and more bit surface on the hole bottom as the blades penetrate deeper into soft formations, thereby safeguarding complete watercourse blocking when a bit is overloaded in soft formations. An additional feature to prevent bit blocking is a series of auxiliary transverse water courses within the body of the bit, said auxiliary water courses being transversely slotted to communicate with the bottom of the bit. The bit's jets pass vertically through these auxiliary water-courses.*

*Description*

This invention relates to a drilling bit and, more particularly, to a drilling bit combining features of a cutting blade or drag bit and an abrading type bit.

Both drag or blade type bits and abrading bits have long been used for drilling well bores through the subsurface strata of the earth, but blade bits are generally useful only in softer formations and abrading bits, such as the diamond bits, are, as a rule, useful only in the harder formations. Previous efforts have been made to combine the characteristics of the two by providing a series of generally radial blades and coating the bottom of the blades with numerous particles of hard material such as diamond chips. However, considerable difficulty has been experienced in the use of such bits, particularly in soft formations. There, the segments of the bit between the radially disposed blades often become plugged so that circulation of drilling fluid across the plugged segments is prevented. If only a few of these segments are plugged, the fluid flow is merely diverted to the unplugged segments with no appreciable amount of water pressure being asserted against the plug to clear the bit. In such case, the plug segments continue to accumulate cuttings and may compact into an indurated mass that eventually supports the entire bit weight and prevents operating engagement of the drilling cutters. In the event that most segments become plugged, fluid circulation is drastically impaired and there will be an appreciable build-up of fluid pressure. With return fluid flow impeded when employing reverse circulation, the fluid developes pressure in the well bore, which may be sufficient to fracture the sub-surface formation, and cause lost circulation.

The above-described problems are particularly prevalent in reverse circulation core drilling bits wherein fluid is circulated from the periphery of the bit toward the center to return to the surface through a central core tube. In such case the drill bit segments through which the fluid passes across the lower face of the bit are, of course, gradually reduced in cross section toward the center of the bit where the radial blades are spaced on a smaller circumference. Consequently fluid circulation works against efforts to release a lodged plug since it tends to wedge it tighter into the water course restriction near the center of the bit.

It is, therefore, an object of this invention to provide a blade-type means for hydraulically scouring the bottom of the bit and hole to remove cuttings and reduce tendencies for a plug to form between blades.

It is a further object of this invention to provide a reverse circulation core-drilling bit having means thereon to prevent the water courses and nozzles from becoming plugged, particularly when drilling soft clay or shale.

It is a further object of this invention to limit the penetration of the blade and hence the cutting rate to a value that production of cuttings does not exceed the capacity of the water courses to scavenge them.

It is still a further object of this invention to provide a low differential drilling fluid pressure across the face of the bit by directing the velocity and flow of the drilling fluid across the bit in a manner effectively to scour and scavenge cuttings from the water course at the bottom of the hole.

It is a further object of this invention to provide a rotary drill bit including fluid nozzles that discharge fluid jets at high velocity and low pressure.

It is a further object of this invention to provide a blade-type bit having blades impregnated with extremely hard, long-wearing particles.

In carrying out this invention, I provide an annular drill bit body having a series of generally radial blades extending from the lower face thereof. The bottom surfaces of the blades are impregnated with extremely hard particles such as diamonds so that they may abrade and cut hard formations with the forward faces of the blades shearing through softer formations. The annular bit is primarily intended for core drilling and the central opening therein is adapted to receive a core and to provide a flow conduit for return circulation of drilling fluid. A series of conduits or jets open from the top of the bit into nozzles at the lower end thereof immediately forward of each blade so that a jet of high velocity is ejected against the bottom of the formation, thence to scour across it to the central return passage. The bit is also provided with transverse water courses which extend just above the bottom of the bit from the outside of the bit radially inward to the center opening in registry with the jet nozzles. The transverse water courses are of gradually increasing cross section as they extend radially inward so that fluid flow operates to prevent cuttings from becoming lodged therein. Even if cuttings become temporarily lodged even a slight movement will free them. Trailing each blade is a penetration-limiting surface that may be inclined upwardly to terminate in a slot that opens into the transverse water course. Thus, if the bit is imbedded to the depth permitted by the penetration-limiting surface the cuttings will be directed into the slot and urged by the high velocity jet of fluid along the transverse water course of gradually increasing cross section.

Other objects and advantages of this invention will become apparent from the description following when read in conjunction with accompanying drawings wherein.

Figure 13:
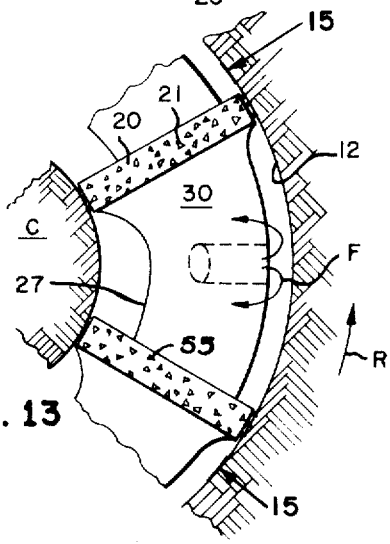
FIGS. 13 and 14 are partial bottom views of the drill bit of FIG. 12.
Figure 15:
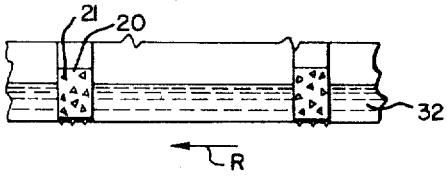

And FIG. 15 is a projected view taken along line 15—15 of FIG. 13.

Referring now to FIGS. 12 to 15, I have illustrated a drilling bit 10 that is commonly used in reverse circulation and core drilling to drill a bore 12 in a sub-surface formation 14 while cutting a core C. The bit includes a tubular shank portion 16 and an annular bit head 18 bonded at the lower end of the annular shank and including a plurality of generally radial blades 20 in the bottom portion of which are imbedded a large number of hard particles such as diamond chips 21. A series of fluid nozzles 22 are cut through the tubular shank to the exterior thereof and the upper end of the shank is threaded at 23 for connection to a drill pipe 24 to form the downward flow passage 25. The core tube 26 is centered within the outer pipe and the drill bit and is sealed to the inner cylindrical surface 27 of the annular drill bit by any suitable means, such as an O-ring 28. Thus, the fluid circulation shown by the tail-less arrows F is down through the annular passage 25 between the outer pipe 24 and the core tube 26, out through the nozzles 22 and then down between the bit and the wall 12 of the bore to the bottom of the bore where it flows across the face of the bit between the blades 20 as shown best in FIGS. 13 and 14 to the center opening 27 of the bit where it is directed upward through the core tube 26.

The water course extending radially inward across the bit is formed by the segment 30 between the bit blades 20 and, therefore, is in the shape of a sector of gradually reducing arcuate dimension, and hence cross-section, toward the center opening 27. Thus, the water courses form a restrictive throat in which materials cut from the formation may tend to become lodged. This may become extremely critical in drilling in soft formations such as clay or shale if the bit is overloaded. In such case, the blades 20 may be completely buried as the bit rotates in the direction of the arrow R with the result that the sector 30 between the blades may be completely packed wih material 32 that is separated from the formation. In this condition, the pie-shaped mass of material may become bottled up at the core so that the bit becomes foundered. This not only prevents further drilling but with the water courses between blades 20 being plugged, the continued discharge of fluid from the nozzles 22 into the hole annulus 12 builds up pressure within the bore to the full capacity of the pump. This high pressure may cause, among other things, hydraulic fracturing of the formation 14, resulting in loss of circulation or contamination of oil-bearing formations.

Even if only one water course or sector between blades 20 becomes plugged, the plugged mass may continue to build up as an indurated mass until it supports the entire bit weight. With only one course plugged, the fluid is merely diverted to other water courses 30 so that there is no appreciable pressure build-up that would tend to dislodge the plugging material. Consequently, the material builds up and up and becomes more and more compacted until it can support the entire drilling weight and the cutting blades 20 are rendered almost completely ineffective.

Figure 14:
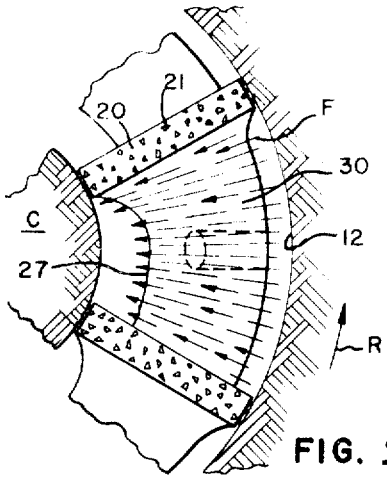

As shown particularly in FIGS. 13 and 14, there is no build-up of high-velocity jet stream to dislodge material between the blades 20 since, by the time the fluid flows from the nozzles 22 to the bottom of the bit, it flows through the large cross-section of the sectors 30 in a relatively low velocity sheet.

Figure 1:
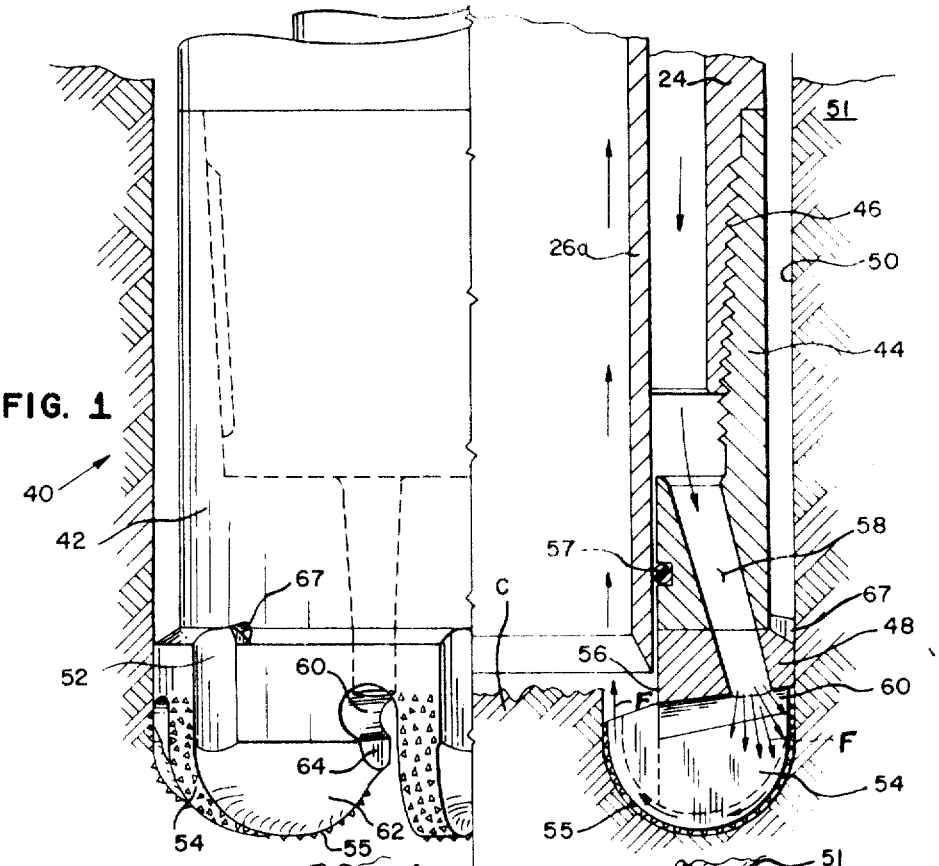
FIG. 1 is an elevational view of a reverse circulation core drilling bit embodying features of this invention with portions thereof being taken in section.
Figure 2:
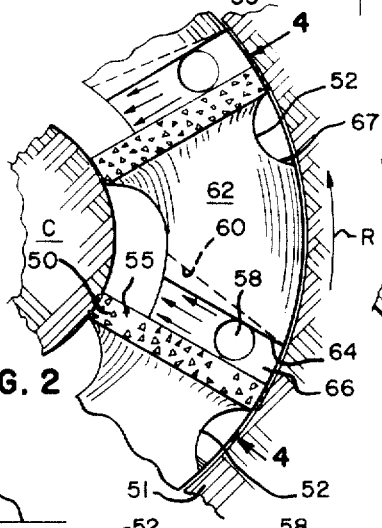
FIG. 2 is a partial bottom plan view of the drilling bit of FIG. 1.

Referring now to FIG. 1, the drill bit of this invention 40 comprises a body portion 42 with a tubular shank 44 which is threaded at 46 for attachment to a drill pipe 24. The bit head 48 which is bonded or otherwise secured at the lower end of the body portion 42 is of substantially full bore diameter and, therefore, it is provided around its periphery with a plurality of flutes 52 to permit passage of fluid past the exterior of the bit as it is lowered or raised within the bore hole 50. The bit head 48 is provided with a plurality of downwardly extending blades 54 with forward, upright shearing faces, preferably of arcuate profile as shown in FIG. 1, to leave a rounded annular bore bottom which forms a smooth flow reversing annular surface which directs circulating fluid upward through the central opening 56 in the annular bit, as shown by the arrows F. While the blade profile shown in FIG. 1 is generally semi-circular it is to be understood that it may be formed by composite, merging curves of different radii. Hard particles 55 such as diamond chips are provided in the bottoms of the blades 54 for cutting hard formations.

A suitable seal, such as an O-ring 57, provides a fluid-tight joint between the interior of the bit body 42 and the core tube 26a so that the core tube forms a conduit extension of the central bit opening 56. Downward flow of fluid is provided through the drill pipe 24 into the tubular shank 44 of the drill bit and then through a series of jets or nozzles 58, which are directed to discharge the fluid against the bore hole bottom underneath the bit to scour the bottom in front of the blades 54 from the bore wall 50 to the core C. As shown in FIG. 1, the mouth of the jet is placed as close as possible to the bottom of cutting blades 54 in order to maintain a concentrated high velocity, low pressure jet stream at impact with the bottom of the well bore. The high velocity discharge is achieved as a consequence of a reduction in conduit cross-section in the nozzles 58 for pressure build-up, and since the nozzles open near the bottom of the blades 54, the resultant high velocity is maintained at impact.

Figure 3:
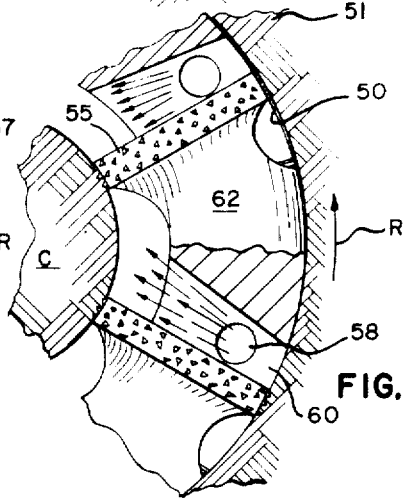
FIG. 3 is a partial bottom view similar to FIG. 2 with portions thereof cut away to show water courses.

Extending in a generally radial direction completely through the bit head 48 and in registry with the bit nozzles 58, i.e., immediately in front of each blade 54, is a plurality of water courses 60 which, as shown most clearly in FIG. 3, are of progressively increasing diameter from the periphery of the bit to the center opening thereof, so that they flare outward in the direction of fluid flow. The blades 54 are reinforced at their backs with non-impregnated, erodible fillets 61 and with tapered segments 62 that function to limit the penetration of the blades 54. Preferably, the segments 62 are inclined upwardly and terminate in a trailing edge 64, which forms a slot 66 bringing the water course 60 into communication with the bottom of the bit.

The width of the blades 54 is determined by the hardness of the formations to be drilled as well as the amount of weight available for application to the bit and, of course the number of blades over which such weight is distributed. With a small amount of available weight the blades must be relatively narrow so that the area over which the weight is distributed is minimized to provide maximum pressure per unit area so that the hard particles, such as diamonds, may penetrate sufficiently to cut a reasonable depth in hard rock. On the other hand, when considerable weight is available for bit loading the blades can be relatively wide, even to the extent that the total blade area may constitute a substantial percentage of the bore hole area. The bit is intended to cut as an abrasion bit when drilling hard rock whereby the diamonds act as numerous small cutting bits, each cutting by shearing action a small path equal to its width. When drilling soft formations the blades penetrate as a body and the cutting action is similar to a conventional blade or drag bit, whereby a continuous shaving is removed equal in thickness to the blades' penetration.

At the top of the bit head 48 I provide a series of cutting tools 67 which permit the bit to be drilled out of a caved hole. Thus, in the event that the formation around the well bore 50 caves in above the bit, the drill pipe may be raised until the auxiliary bits contact the caved material and with the pipe 24 rotated the cutting bits shave off the caved material. Because of the relief angle of the cutting tools 67 the shavings are forced into and through the flutes 52. These cutting tools may be shaped from hard metals or carbides and welded in place.

Figure 4:
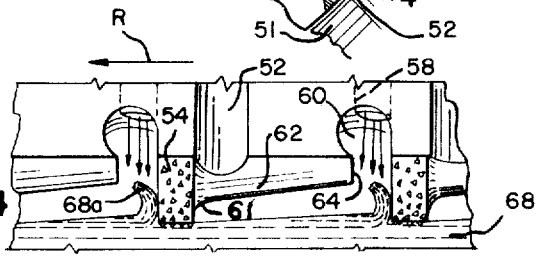
FIGS. 4, 5 and 6 are projected views taken along line 4—4 of FIG. 2 showing drilling conditions at gradually increasing penetration.
Figure 5:
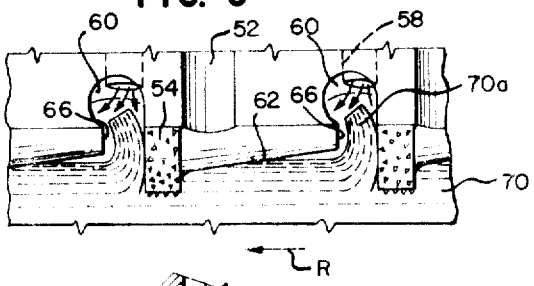
Figure 6:
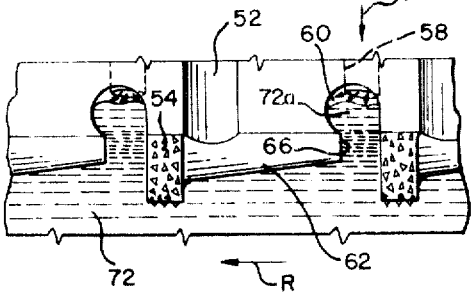

FIGS. 4, 5, and 6 illustrate progressively increasing blade penetration occasioned by decreasing resistance of the medium being drilled. For example, FIG. 4 shows a normal penetration when drilling as a drag bit in a hard medium 68, and in this instance, the fluid and cuttings 68a have adequate transverse passageway through which they may be directed to the central bit opening 56 into the core tube 25, and with the penetration-limiting surface of the sectors 62 being free of the formation, all of the weight of the bit is carried on the blades 54 and their cutting diamonds 66 so that maximum weights per unit area is imparted to the formation.

In FIG. 5, the formation 70 is somewhat softer and the blade penetration is much greater. In this case, the weight on the bit is distributed, not only under the blades 54 but also under much of the area under the tapered penetration-limiting segments 62. Consequently, with the same bit loading, the load or pressure per unit area on the formation below the bit is reduced considerably because it is distributed over a wider area. With much of the space between the blades 54 plugged, most of the cuttings 70a are directed through the transverse water courses 60 after being cammed by the leading edge of the blades 54 through the slot 66 opening into the water courses. It will also be noted that the drilled medium 70, by engaging the penetration-limiting surface 62 intermediate the flutes 52 and the slots 66 opening into the water courses 60, seals off the water courses 60 from the annulus of the bore hole 50, which, as shown in FIG. 1, is otherwise sealed around its periphery by the substantially full bore hole diameter of the bit body 48. Additionally, the small clearance between the bit body and the bore hole is further sealed by bit cutings 70a. Thus, the fluid from each jet 58 is confined to its own water course 60 so that full pressure thereof is asserted against those cuttings 70a in the water course to provide maximum performance in disintegrating and evacuating such cuttings. Moreover, the isolation of the water courses from the well bore 50 protects the surrounding formation 51 from excessive pressure that may result from wholly or partially plugged water courses.

In FIG. 6, the formation 72 being drilled is of even softer substance whereby blade penetration is at a maximum and all of the area under both the blades 54 and the inclined segments 62 are in contact with the formation so that the weight per unit area on the well bore bottom is at a minimum value for a given bit loading.

It will be noted that the formation cuttings 72a may be extruded through the relatively narrow slot 66 opening into the relatively wider water course 60 so that any of the formation cuttings 72a compressed at the slot 66 have room for expansion and generally leave space for evacuation as they are bombarded by the jet stream from the nozzles 58. In the condition as shown in FIG. 6 all of the discharge of drilled material 72a is by way of the transverse water courses 60 and, since the water courses and the jets 58 are recessed from the well bottom, they are protected again plugging by any overloaded bit in a soft formation. Moreover, since the water courses 60 flare outwardly from the periphery to the center of the bit, any material that may tend to jam and plug the water course will be freed just by moving it minutely. Thus, the configuration of the water courses and fluid stream flowing therethrough cooperate to improve evacuation of cuttings.

Figure 8:
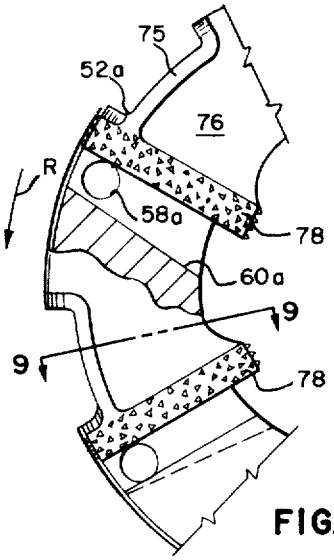
FIG. 8 is a fragmentary bottom view in partial section of the bit of FIG. 7.
Figure 7:
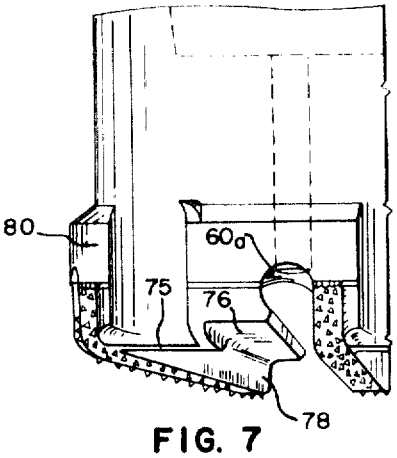
FIG. 7 is a fragmentary elevational view of a modified form of drilling bit.

In FIGS. 7 and 8, I have shown a modified form of my invention wherein a series of dams or barriers 75 are formed to extend downward from the penetration-limiting surface 76 to engage the well bottom behind the blades 78 which, though shown relatively flat on the bottom may be of other configuration. The barriers 75 are formed in the periphery of the bit head 80 so that the flutes are confined thereby as the barrier 75 rests on the bottom of the bore.

Figure 9:
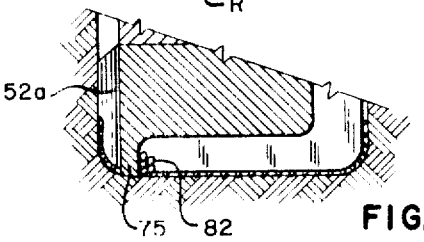
FIG. 9 is a section view taken on line 9—9 of FIG. 8.

When the bit is being lowered or raised within the bore hole the flutes 52a are open to pass fluid freely but when the bit is on the bottom, they are closed by the barriers 75 so that there is no communication between the jets 58a, or water courses 60a and the hole annulus 50. This is particularly desirable in dual pipe reverse circulation drilling in that it protects the bore hole from *pressure* build-up at the bit and prevents the intermingling of the drilling fluid with the relatively static fluid that is contained within the bore hole annulus while drilling. The barrier [78] *75* will not make an absolutely fluid-tight seal with the bottom of the bore hole, but the small amount of fluid flow that can leak by will carry with it small cuttings 82 or special particles that may be added to the drilling fluid, and such particles accumulate at the barrier 75 and ultimately render it essentially fluid tight (FIG. 9).

Figure 10:
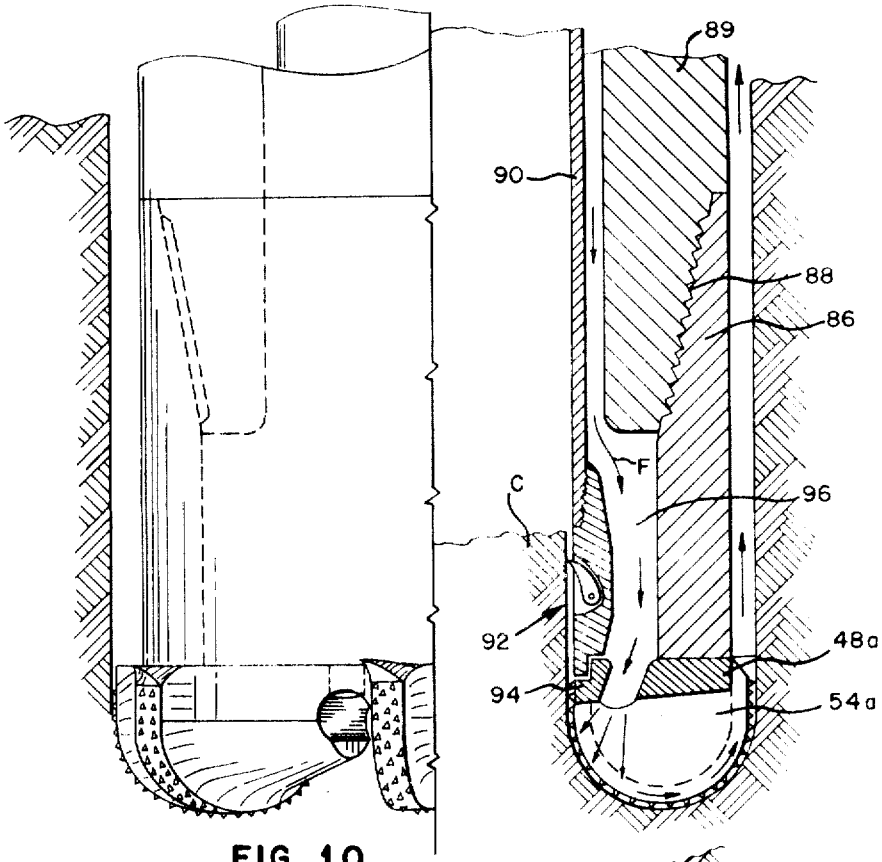
FIG. 10 is an elevational view partly in section of still another embodiment of this invention.
Figure 11:
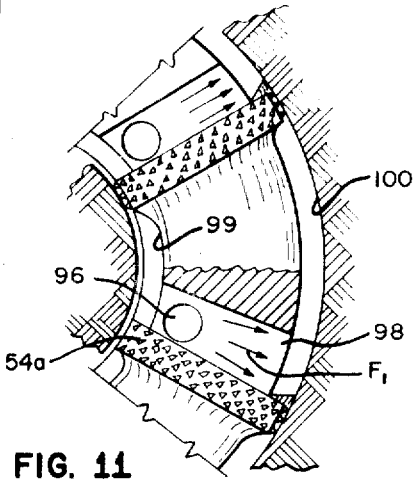
FIG. 11 is a fragmentary plan view partly in section of the bottom of the bit of FIG. 10.
Figure 12:
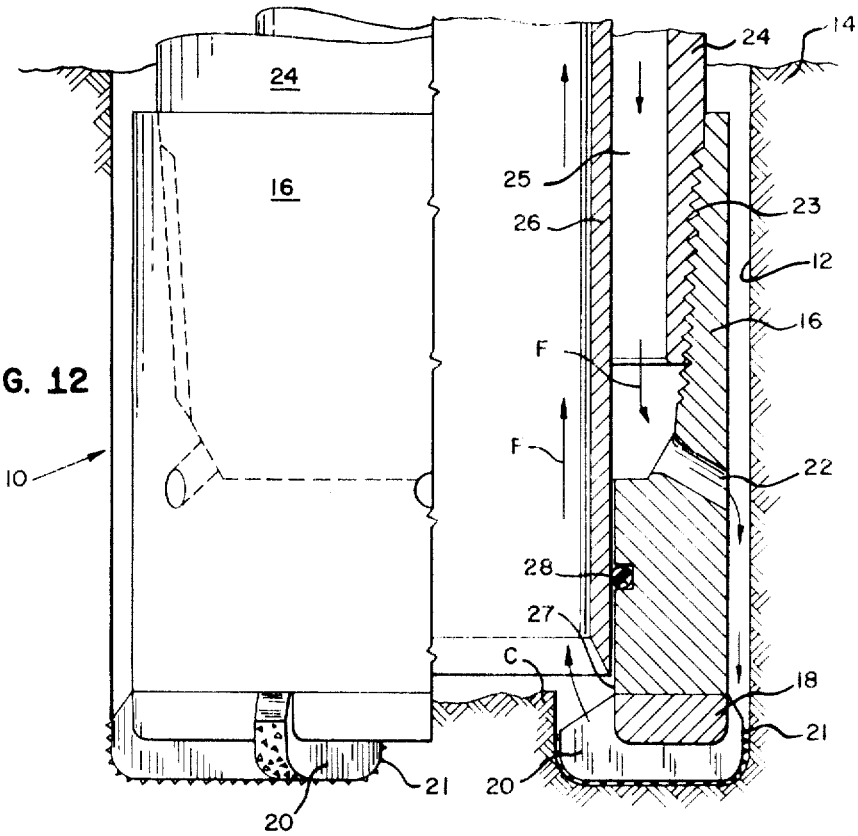
FIG. 12 is an elevational view partly in section of a reverse circulation, core drilling bit previously employed.

In FIGS. 10 and 11 I show another embodiment of my invention adapted for use with conventional fluid circulation. Here the tubular shank of the bit body 86 is threaded at 88 for attachment to the drill pipe 89 and cutting blades 54a similar to those shown in FIG. 1 are provided at the bottom of the bit head 48a. At the lower end of the swiveled core tube 90 I provide a conventional core catcher 92 which is adapted to grip the core C to keep it from falling out when the drill pipe is being withdrawn from the well. A suitable seal such as the labyrinth seal 94 is provided at the lower end of the core catcher to effect a seal and still permit relative rotation between the core tube 90 and the bit head 48a.

In this modification, the jet conduit 96 opens into the transverse water courses 98 near the center opening 99 of the bit and are enlarged progressively as they move toward the outside. Thus, if the bit founders, the flow is in the flared water courses in the direction of the arrows $F_1$. Normally, the flow is in the direction of the arrows F from the center of the bit, against the bottom of the hole and then up around the outside of the bit within the well bore 100.

I prefer to make the bit heads by sintering a matrix material that is hard but easily abraded. Thus, as individual diamonds wear away, or are severed from the matrix material, the material is abraded away to expose new diamonds embedded below the surface.

While this invention has been described in connection with preferred embodiments thereof, it is apparent that modifications and changes therein may be made without departing from the spirit and scope of this invention, as defined by the claims appended hereto.

Having described my invention, I claim:

1. A drill bit comprising:

a body adapted to be secured to the lower end of a drill pipe and rotated thereby, at least one blade protruding below the bottom of said body and extending transversely across said body from the periphery thereof to a central portion thereof, a penetration-limiting surface trailing said blade on said bottom of the body, a water course passageway extending transversely through said body between the periphery thereof and a radially inward portion thereof, a fluid jet conduit extending downward through said body from the upper end thereof and opening in said passageway adjacent one end thereof, said passageway being flared outward to enlarged cross-section from said one end thereof to the other end thereof, and means at the trailing portion of said penetration-limiting surface forming an elongated restricted throat opening transversely across said surface into said passageway, said passageway being displaced above said penetration-limiting surface.

2. The drill bit defined by claim 1 wherein:

said jet conduit opens into said passageway adjacent the periphery of said body and including:

a return conduit extending upward through the central portion of said body, said passageway discharging into said central conduit.

3. The drill bit defined by claim 2 including:

portions around said outer surface of a diameter large enough to restrict [from] *flow* around said bit body in a well bore, and groove means in the outer surface of said body displaced from said passageway and opening into said penetration-limiting surface to bring the bore hole annulus above said bit into communication with the underside thereof.

4. The drill bit defined by claim 3 including:

a barrier extending below said bottom of the body around said groove means and engageable with the bottom of a bore hole to block flow between the underside of said body and said groove means.

5. A drill bit comprising:

a body adapted to be secured to the lower end of a drill pipe and rotated thereby, a series of blades protruding below the bottom of said body, and extending transeversely thereof from the periphery thereof to a central portion thereof, a penetration-limiting surface on said bottom of the body trailing each of said blades, a water course passageway in advance of each of said blades extending transversely through said body between the periphery thereof and radially inward portion thereof, a series of fluid jet conduits extending downward through said body from the upper end thereof and opening in said passageways adjacent one end thereof, each of said passageways being flared outward to enlarged cross-section from said one end thereof to the other end thereof, and slot means at the trailing portions of said penetration-limiting surfaces forming restricted throat, through openings transversely across said surfaces into said passageways.

6. The drill bit defined by claim 5 wherein:

each of said jet conduits opens into one of said passageways adjacent the periphery of said body and including:

a return conduit extending upward through the central portion of said body, each of said passageways discharging into said central conduit.

7. The drill bit defined by claim 6 including:

means forming grooves in the outer surface of said body opening into each of said penetration-limiting surfaces at locations displaced from said passageway to bring the bore hole annulus above said bit into communication with the underside thereof, portions around the outer surface of said body being of a diameter large enough to engage the wall of a well being bored by said blades.

8. The drill bit defined by claim 6 including:

a series of barriers extending below said bottom of the body around each of said grooves and engageable with the bottom of a bore hole to block flow between the underside of said body and said grooves.

9. A drill bit comprising:

an annular body adapted to be secured to the lower end of a drill pipe and rotated thereby, a series of cutting members extending downward from and across the bottom of said body, portions around said body of an outer diameter large enough to restrict flow thereby in a well being drilled by said cutting members, a generally radial water course passageway extending through said annular body from the periphery thereof to the central opening in advance of each of said cutting members, each of said passageways being of increasing cross-section from the outer to the inner end thereof, a series of fluid jet conduits extending downward through said body from the upper end thereof each to open in one of said passageways in the radially outward portion thereof, and said central opening in said annular body forming a return conduit, means forming grooves in the outer surface of said body through said flow restricting portions at locations displaced from said passageway to bring the bore hole annulus above said bit into communication with the underside thereof.

10. The drill bit defined by claim 9 including:

a series of barriers extending below said bottom of the body around each of said grooves and engageable with the bottom of a bore hole to block flow between the underside of said body and said grooves.

11. The drill bit defined by claim 9 including:

reaming cutter means around the upper surface of said flow restricting portions.

*12. In earth boring with a dual-tube drill pipe system, having an outer drill pipe and a core tube within the drill pipe, and a drill bit having nozzles attached to the bottom of the drill pipe, and having drilling fluid circulated downward in the annulus between the drill pipe and the core tube, thence through the bit's nozzles into the earth bore, thence returning to the earth's surface in core tube, the improvement for insuring that the return flow of the drilling fluid is in the core tube rather than upward in the bore hole annulus, said improvement comprising:*

*solid barrier means in the down-hole assembly blocking fluid flow in the bore hole annulus.*

References Cited

The following references, cited by the Examiner, are of record in the patented file of this patent or the original patent.

UNITED STATES PATENTS

| | | | |
|---|---|---|---|
| 2,371,489 | 3/1945 | Williams | 175—329 |
| 3,058,535 | 10/1962 | Williams | 175—330 |
| 3,153,458 | 10/1964 | Short | 175—329 |
| 3,215,215 | 11/1965 | Kellner | 175—330 |

NILE C. BYERS, Jr., Primary Examiner